United States Patent
Chang et al.

(10) Patent No.: US 8,963,851 B2
(45) Date of Patent: Feb. 24, 2015

(54) MOVING POINT GESTURE DETERMINATION METHOD, TOUCH CONTROL CHIP, TOUCH CONTROL SYSTEM AND COMPUTER SYSTEM

(75) Inventors: Hui-Hung Chang, Keelung (TW); Chun-Chieh Chang, Hsinchu (TW); Chih-Chang Lai, Hsinchu County (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 585 days.

(21) Appl. No.: 13/191,460

(22) Filed: Jul. 27, 2011

(65) Prior Publication Data
US 2012/0194445 A1   Aug. 2, 2012

(30) Foreign Application Priority Data
Feb. 1, 2011 (TW) .............................. 100103802 A

(51) Int. Cl.
*G06F 3/041* (2006.01)
*G06F 3/0488* (2013.01)

(52) U.S. Cl.
CPC ............ *G06F 3/0488* (2013.01); *G06F 3/0416* (2013.01)
USPC .......................................... 345/173; 715/863

(58) Field of Classification Search
CPC ........ G06F 3/017; G06F 3/014; G06F 3/0488; G06F 3/0487; G06F 3/0884
USPC .................... 345/173, 174; 178/18.01, 18.03; 715/863
See application file for complete search history.

(56) References Cited

U.S. PATENT DOCUMENTS

| | | | |
|---|---|---|---|
| 5,880,411 A * | 3/1999 | Gillespie et al. | ............... 345/173 |
| 2002/0118131 A1 * | 8/2002 | Yates et al. | |

* cited by examiner

*Primary Examiner* — Regina Liang
(74) *Attorney, Agent, or Firm* — Winston Hsu; Scott Margo

(57) ABSTRACT

A moving point gesture determination method is disclosed for a touch sense device mapped to a screen according to absolute position. The moving point gesture determination method includes steps of comparing one or more signal values of one or more detecting signals generated by the touch sense device with one or more threshold values, to determine whether any touch event occurs, and determining that a moving point gesture occurs once the determination indicates that a touch event occurs.

18 Claims, 6 Drawing Sheets

MOVING POINT GESTURE DETERMINATION METHOD, TOUCH CONTROL CHIP, TOUCH CONTROL SYSTEM AND COMPUTER SYSTEM

BACKGROUND OF THE INVENTION

1. Field of the Invention

The present invention relates to a moving point gesture determination method, and more particularly, a moving point gesture determination method, touch control chip and a touch control system using the same, and computer system facilitating more intuitive and more convenient operations by allowing users to directly move an object corresponding to a touch point, without first confirming an operation.

2. Description of the Prior Art

Generally, touch sensing devices such as capacitive, resistive and other types of touch sensing devices, are capable of generating detecting signals related to a touch event by a user and providing them to a touch sensing chip; the chip then compares the signal values of the detecting signals with threshold values to determine a touch point, and in turn, a gesture, according to the results. In the example of capacitive touch sensing devices, touch events are determined by detecting the capacitance difference generated when the human body touches a touch point on the touch panel; in other words, capacitive touch sensing is implemented through determining a touch point, and in turn, a touch event, by detecting the variations in capacitance characteristics when the human body touches the touch point.

Specifically, please refer to FIG. 1, which illustrates a conventional projected capacitive touch sensing device 10. The projected capacitive touch sensing device 10 includes sensing capacitor strings $X_1$-$X_m$, $Y_1$-$Y_n$; each sensing capacitor string is a one-dimensional structure formed by connecting a plurality of sensing capacitor in series. Conventional touch sensing methods resort to detecting the capacitance in each sensing capacitor string to determine whether a touch event occurs. The sensing capacitor strings $X_1$-$X_m$ and $Y_1$-$Y_n$ are utilized to determine vertical and horizontal touch events, respectively. In the case of horizontal operations, assume the sensing capacitor string $X_1$ has Q sensing capacitors, each sensing capacitor with a capacitance of C, then under normal circumstances, the sensing capacitor string $X_1$ has a capacitance of QC; and when the human body (e.g. a finger) comes in contact with a sensing capacitor of the sensing capacitor string $X_1$, assume the difference in capacitance is $\Delta C$. It follows that, if the capacitance of the sensing capacitor string $X_1$ is detected to be greater than or equal to a predefined value (e.g. QC+$\Delta C$), it can be inferred that the finger is touching a certain point on the sensing capacitor string $X_1$. Likewise, the similar may be asserted for vertical operations. As illustrated in FIG. 1, when the finger touches a touch point TP1 (i.e. coordinates ($X_3$, $Y_3$)), the capacitance in the sensing capacitor strings $X_3$ and $Y_3$ concurrently varies, and it may be determined that the touch point falls at coordinates ($X_3$, $Y_3$). Notice, however, that the threshold capacitance of the sensing capacitor strings $X_1$-$X_m$, for determining vertical directions, and the threshold capacitance of the sensing capacitor strings $Y_1$-$Y_n$, for determining horizontal directions, do not necessarily have to be the same, depending on the practical requirement.

As can be seen from the above, the touch control chip compares signal values of the detecting signals generated by the touch sensing device with predefined threshold values, so it is possible to determine positions of all touch points and continuous occurrence times from start to end of a touch event, and in turn, to determine a gesture.

As for moving point gesture determination, since conventional moving point gestures apply to touch panels on notebook computers, and dimensions of the touch panels are often limited, with only a fraction of an area of the notebook computer screen, thus operations are limited to using relative position mapping. Consequently, conventional moving point gesture detection impose certain determination conditions, requiring users to first click to confirm an object to be moved, to prevent a faulty determination of a position of the object to be moved.

Specifically, please refer to FIG. 2, which is a schematic diagram of conventional moving point gesture determination conditions. In FIG. 2, a downward arrow denotes a starting time point of a touch, i.e. corresponding to an entering point; an upward arrow denotes an ending time point of the touch, i.e. corresponding to a leaving point. As shown in FIG. 2, a continuous occurrence time T1 is a time from a start of a first touch until leaving, and a touch interval time T2 is a time interval from the start of the first touch to a start of a second touch. Under such circumstances, conventional moving point gesture determination conditions only determine a moving point gesture occurs when two prerequisites are concurrently substantiated: the continuous occurrence time T1 is shorter than a reference time $T1_{ref}$ and the touch interval time T2 is shorter than a reference time $T2_{ref}$. Such determination conditions imply that when performing a moving point gesture, users are required to click a first time to confirm an object to be moved, and then click a second time within the reference time $T2_{ref}$ to commence moving the object.

Next, please refer to FIG. 3, which is a schematic diagram of operations of a conventional moving point gesture, taking a notebook computer as an example. A screen 32 provides the user with needed information, and a touch panel 30 allows the user to perform touch operations. Since that the touch panel 30 is smaller in area than the screen 32, or that the touch panel 30 and the screen 32 are not superimposed (disposed on top of each other), the touch panel 30 and the screen 32 are mapped according to a relative position mapping. As shown in FIG. 3, the screen 32 displays objects OB1, OB2 and a cursor CS. Under such circumstances, since the touch panel 30 is mapped to the screen 32 according to relative position, when intending to move the object OB1, the user is required to first click on the touch panel 30, move, leave, and then repeat this process a number of times to move the cursor CS from an original position to the object OB1. The user then clicks on the object OB1 for confirmation, and then clicks again within the reference time $T2_{ref}$ to commence moving the object. Note that, during moving the cursor CS, it is possible that the cursor CS stops over the object OB2 while the user is during the process of clicking, moving and leaving; however, since conventional moving point gesture requires first clicking for confirmation, then clicking again within the reference time $T2_{ref}$ to commence moving, a possibility of mistakenly determining the user is performing a moving point operation on the object OB2 is precluded.

However, recent years have seen an integration of screens and touch sense devices (e.g. touch panels) with absolute position mapping turning into the mainstream. By definition, absolute position mapping represents that an absolute position of any touch point on a touch sense device may be directly mapped to an absolute position of any touch point on a screen, i.e. the touch panel and the screen have resolutions with a one-to-one mapping. In such devices, an area of the touch sense device approximates that of the screen, or the touch sense device and the screen are superimposed on top of each other. When using such devices, users may intuitively move around the screen to perform touch operations, and an absolute position on the screen maps to a corresponding absolute position on the touch panel. However, as described above, complexities of conventional moving point gesture determination conditions preclude users from intuitively performing moving point operations on such devices.

Hence, in response to technological developments and a change in mapping relationships between the touch panel and the screen, it is necessary to improve over conventional moving point gesture determination conditions, to accommodate touch sense devices utilizing absolute position mapping with the screen, and allow users to perform moving point gestures more intuitively.

SUMMARY OF THE INVENTION

The present invention discloses a moving point gesture determination method, touch control chip and touch control system using the same, and computer system, allowing users to perform intuitive operations by directly moving an object at a corresponding touch point without first confirmation.

The present invention discloses a moving point gesture determination method for a touch sense device, wherein the touch sense device and a screen are mapped according to absolute position, the moving point gesture determination method including comparing signal values of one or more detecting signals generated by the touch sense device with one or more threshold values, to determine whether a touch event occurs according to a result of the comparison; and once the determination indicates that the touch event occurs, determine a moving point gesture occurs.

The present invention further discloses a touch control chip for a touch control system. The touch control system further includes a touch sense device, wherein the touch sense device and a screen are mapped according to absolute position. The touch control chip includes a detection unit, for comparing signal values of one or more detecting signals generated by the touch sense device with one or more threshold values; and a determining unit, for determining if any touch event occurs according to a result of the comparison, and determining a moving point gesture occurs once the determination indicates that the touch event occurs.

Moreover, another embodiment further discloses a touch control system. The touch control system includes a touch sense device, for generating one or more signal values of one or more detecting signals, and mapped to a screen according to absolute position; and the aforementioned touch control chip, for determining a moving point gesture according to the one or more signal values of the one or more detecting signals generated by the touch sense device.

Moreover, another embodiment further discloses a computer system, including the aforementioned touch control system, for determining a moving point gesture; a host, for receiving a packet of the moving point gesture from the touch control system; and a screen, mapped to a touch sense device of the touch control system according to absolute position.

These and other objectives of the present invention will no doubt become obvious to those of ordinary skill in the art after reading the following detailed description of the preferred embodiment that is illustrated in the various figures and drawings.

DETAILED DESCRIPTION

For touch panels and other touch sense devices mapped to a screen according to absolute position, e.g., medium or large size displays, following embodiments consider that such absolute position mapping allows users to directly click on a position of an object to be moved, without having to first click, and then move and leave the object so as to move a cursor over to the object to be moved as required for relative-position-mapped devices. Under such considerations, the conditions of the moving point determination used in the following embodiments allow users to simply and directly click on the object to be moved, unlike conventional determination conditions which require users to first click to confirm the object to be moved and undergo other redundant and unintuitive operations. Accordingly, users are allowed to intuitively and conveniently perform moving point gestures.

Figure 1:
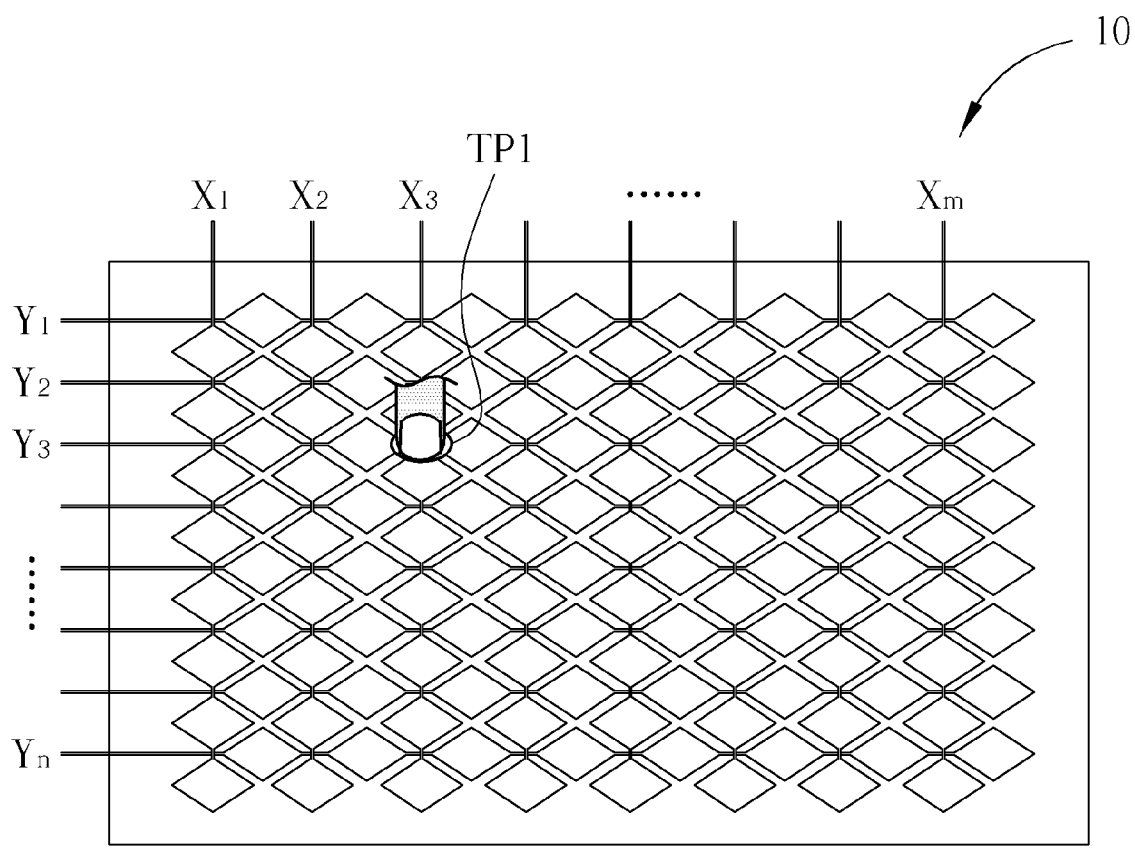
FIG. 1 is a schematic diagram of a conventional projected capacitive touch sensing device 10.
Figure 2:
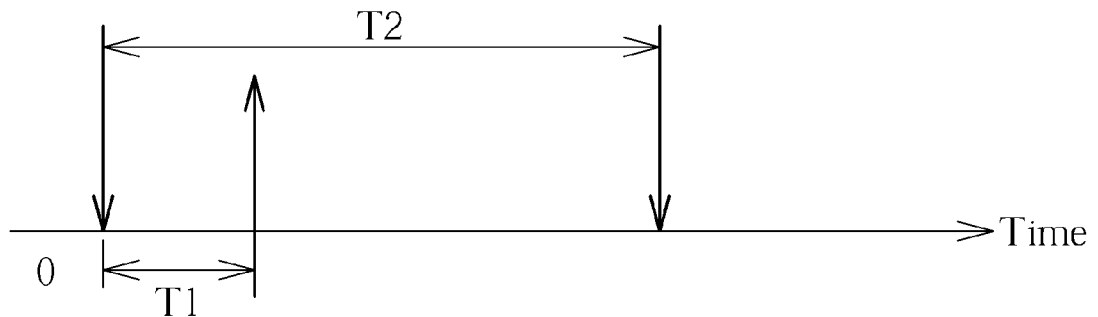
FIG. 2 is a schematic diagram of conventional moving point gesture determination conditions.
Figure 3:
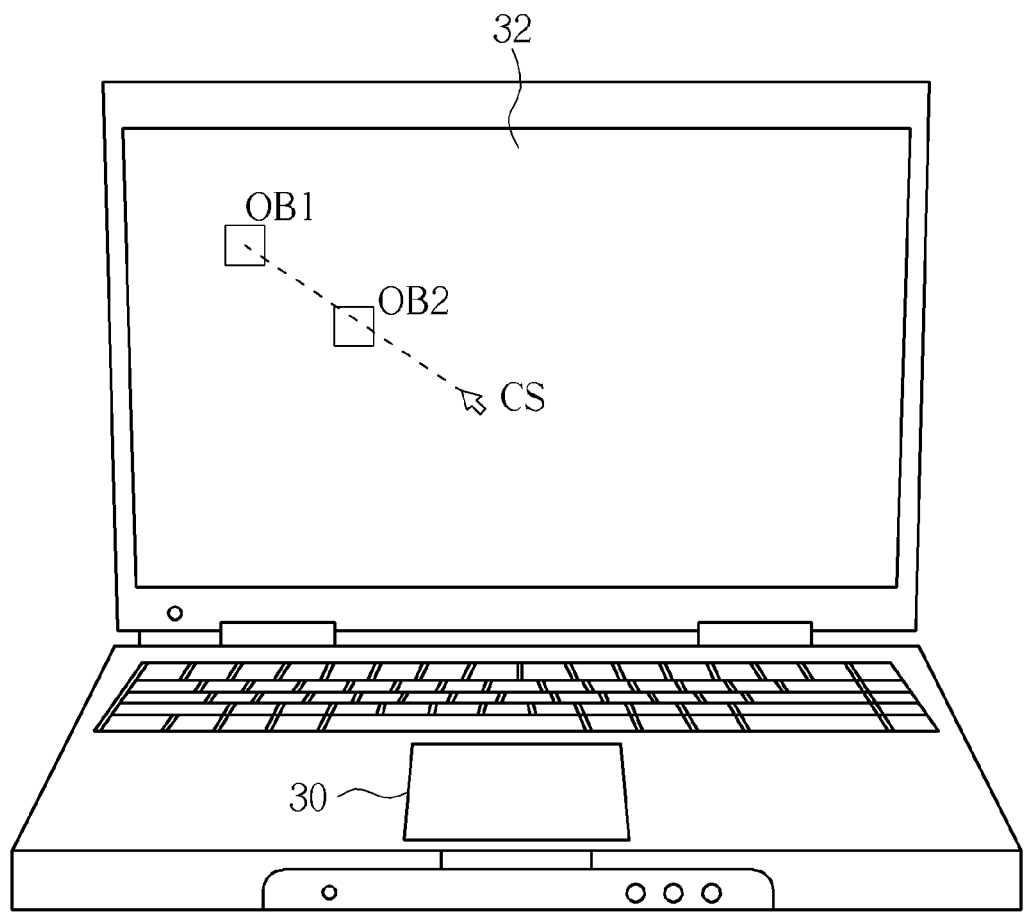
FIG. 3 is a schematic diagram of operations of a conventional moving point gesture on a touch panel mapped to a screen according to relative position.
Figure 4:
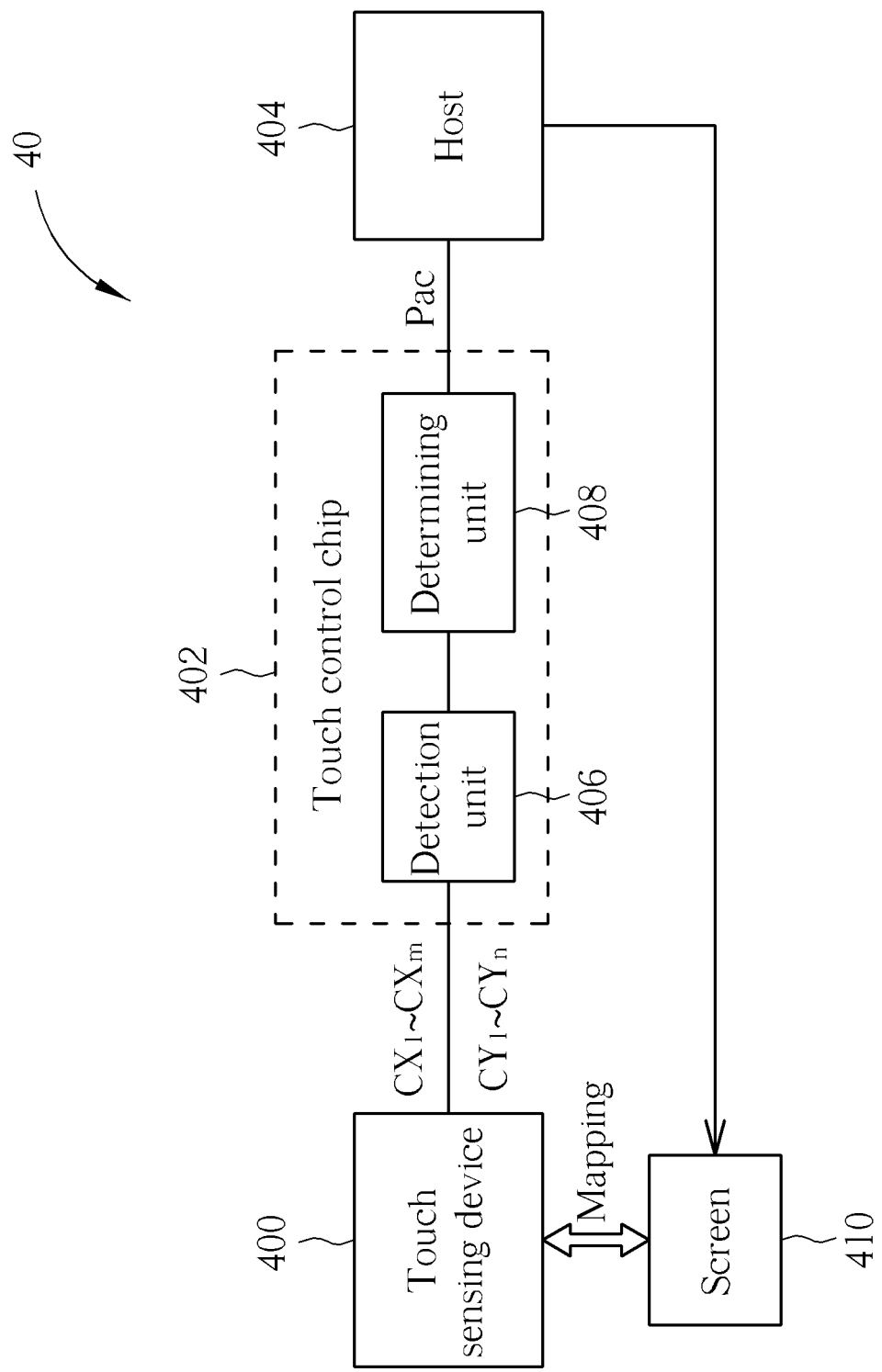
FIG. 4 is a functional block diagram of a computer system according to an embodiment.

Please refer to FIG. 4, which is a functional block diagram of a computer system 40 according to an embodiment. As shown in FIG. 4, the computer system 40 is mainly formed by a touch sense device 400, a touch control chip 402 and a host 404, wherein the touch sense device 400 and the touch control chip 402 constitute a touch control system.

The touch sense device 400 detects an object to be sensed (e.g. a finger, a pen, etc) and generates one or more detecting signals indicating a position of the object to be sensed on a detecting panel (not shown). The touch control chip 402 includes a detection unit 406 and a determining unit 408. The detection unit 406 compares signal values of the one or more detecting signals with one or more threshold values, and the determining unit 408 in turn determines whether any touch event occurs according to a result of the comparison. When the determining unit 408 determines a touch event TE occurs, it further determines a moving point gesture occurs. Furthermore, the determining unit 408 continues the comparing after the touch event TE occurs, and determines whether the touch event TE ends according to a result of the comparison. Once the touch event TE ends, it is also determined the moving point gesture ends. Moreover, the determining unit 408 may transmit a packet Pac corresponding to the moving point gesture to the host 404.

Following detailed descriptions are based on a capacitive touch control system for illustrative purposes, wherein the touch sense device 400 is preferably a capacitive touch panel integrated with a screen 410 of the computer system 40, but can also be generalized to resistive or other types of touch control systems, providing that the touch sense device 400 is mapped to the screen 410 of the computer system 40 according to absolute position, not limited to aforementioned examples. The capacitive touch sense device 400 generates capacitance signals $CX_1$-$CX_m$, $CY_1$-$CY_n$ corresponding to sensing capacitor strings $X_1$-$X_m$, $Y_1$-$Y_n$. The detection unit 406 compares the capacitance signals $CX_1$-$CX_m$ and $CY_1$-

$CY_n$ with a vertical threshold value Cvt and a horizontal threshold value Cht, respectively, to determine whether any touch event occurs. Note that, since the touch sense device 400 is mapped to the screen 410 according to absolute position, coordinates determined by the touch sense device 400 can be equal to coordinates on the screen 410, i.e., with a 1:1 ratio.

More specifically, as the detection unit 406 perform the comparison, if a result of the comparison indicates a capacitance signal of the capacitance signals $CX_1$-$CX_m$ is greater than the vertical threshold value Cvt and a capacitance of the capacitance signals $CY_1$-$CY_n$ is greater than the horizontal threshold value Cht, the determining unit 408 determines that the touch event TE starts to occur, and also determines that a moving point gesture occurs. Concurrently, the determining unit 408 may further determine that a moving path of the moving point gesture starts at an entering point TI1 when the touch event TE occurs.

Next, after detecting the touch event TE occurs, the detection unit 406 continues comparing the capacitance signals $CX_1$-$CX_m$, $CY_1$-$CY_n$ with the vertical threshold value Cvt and the horizontal threshold value Cht, respectively, to detect all touch points before the touch event TE ends.

When comparison results of the detection unit 406 indicate none of the capacitance signals $CX_1$-$CX_m$ is greater than the vertical threshold value Cvt or none of the capacitance signals $CY_1$-$CY_n$ is greater than the horizontal threshold value Cht, the determining unit 408 can determine the touch event TE ends, and further determine the moving point gesture ends. Concurrently, the determining unit 408 may also determine the moving path of the moving point gesture ends at a leaving point TO1 when the touch event TE ends.

In the aforementioned process, the determining unit 408 may generate a corresponding packet Pac to the host 404, for the host 404 to operate according to the packet Pac. Note that, the vertical threshold value Cvt and the horizontal threshold value Cht may or may not be the same, depending on practical requirements. Aforementioned operations pertaining to touch point determination are similar to that of the projected capacitive touch sensing device 10, and are not described here in further detail. Consequently, the user may intuitively move the object to be moved directly after clicking on it, without having to first click for confirmation before commencing moving the object.

Note that, to ensure the touch event TE really occurs without mistakes, the detection unit 406 may preferably continue comparing one or more capacitance signals corresponding to a same position (e.g. capacitance signals corresponding to the entering point TI1) with the vertical threshold value Cvt and the horizontal threshold value Cht, respectively, to detect a continuous occurrence time. The determining unit 408 can then determine whether the touch event TE occurs at the same position according to the continuous occurrence time. For instance, the determining unit 408 determines whether the continuous occurrence time of the touch event TE is longer than a predefined time; if so, the determining unit 408 determines the touch event TE occurs at the same position (e.g. determining the moving point gesture starts at the entering point TI1 when the touch event TE occurs); if not, the determining unit 408 determines the touch event TE does not occur at the same position.

In an embodiment implementing aforementioned confirmation mechanism at the start of a moving point gesture, the touch control chip 402 sequentially scans the touch sense device 400, and processes a capacitance of each region into coordinates of touch point positions, i.e. sequentially scan and determine a touch point (each scan taking a certain time, e.g. 10 ms). During each scan, the detection unit 406 compares the one or more capacitance signals corresponding to the same position with the vertical threshold value Cvt and the horizontal threshold value Cht, respectively, and when a comparison result indicates a make state, the detection unit 406 writes a bit combination 01 into a sequence QE. When the determining unit 408 detects the bit combination 01 is written into the sequence QE for a consecutive number of times greater than a predefined number of times CB, it can determine that the continuous occurrence time of the touch event TE is longer than the predefined time. In turn, a position where the moving point gesture occurs can be determined to be the entering point TI1 when the touch event TE occurs. For example, suppose the sequence QE is an 8-bit sequence, when the sequence QE is 01010101, the determining unit 408 determines the moving point gesture occurs at the entering point TI1 when the touch event TE occurs.

Similarly, to ensure the touch event TE really ends and is not a bounce gesture, in a preferred embodiment, the detection unit 406 may continue to compare the one or more capacitance signals corresponding to a same position (e.g. capacitance signals corresponding to the entering point TO1) with the vertical threshold value Cvt and the horizontal threshold value Cht, respectively, to detect a continuous stop time. The determining unit 408 may determine whether the touch event TE ends at the same position according to the continuous stop time. For instance, the determining unit 408 may determine whether the continuous stop time of the touch event TE is longer than a predefined time. If so, the determining unit 408 determines the touch event TE ends at the same position (e.g. determine the moving point gesture ends at the leaving point TO1 when the touch event TE ends); if not, the determining unit 408 determines the touch event TE does not end at the same position.

In an embodiment implementing aforementioned confirmation mechanism at the end of a moving point gesture, the touch control chip 402 sequentially scans the touch sense device 400, and processes a capacitance of each region into coordinates of touch point positions, i.e. sequentially scan and determine a touch point (each scan taking a certain time, e.g. 10 ms). During each scan, the detection unit 406 compares the one or more capacitance signals corresponding to the same position with the vertical threshold value Cvt and the horizontal threshold value Cht, respectively, and when a comparison result indicates a break state, the detection unit 406 writes a bit combination 00 into the sequence QE. When the determining unit 408 detects the bit combination 00 has been written into the sequence QE for a consecutive number of times greater than a predefined number of times CB, it can determine that the continuous occurrence time of the touch event TE is longer than the predefined time. In turn, a position where the moving point gesture ends can be determined to be the leaving point TO1 when touch event TE ends. For example, suppose the sequence QE is an 8-bit sequence, when the sequence QE is 00000000, the determining unit 408 determines the moving point gesture ends at the leaving point TO1 when the touch event TE ends.

Figure 5A:
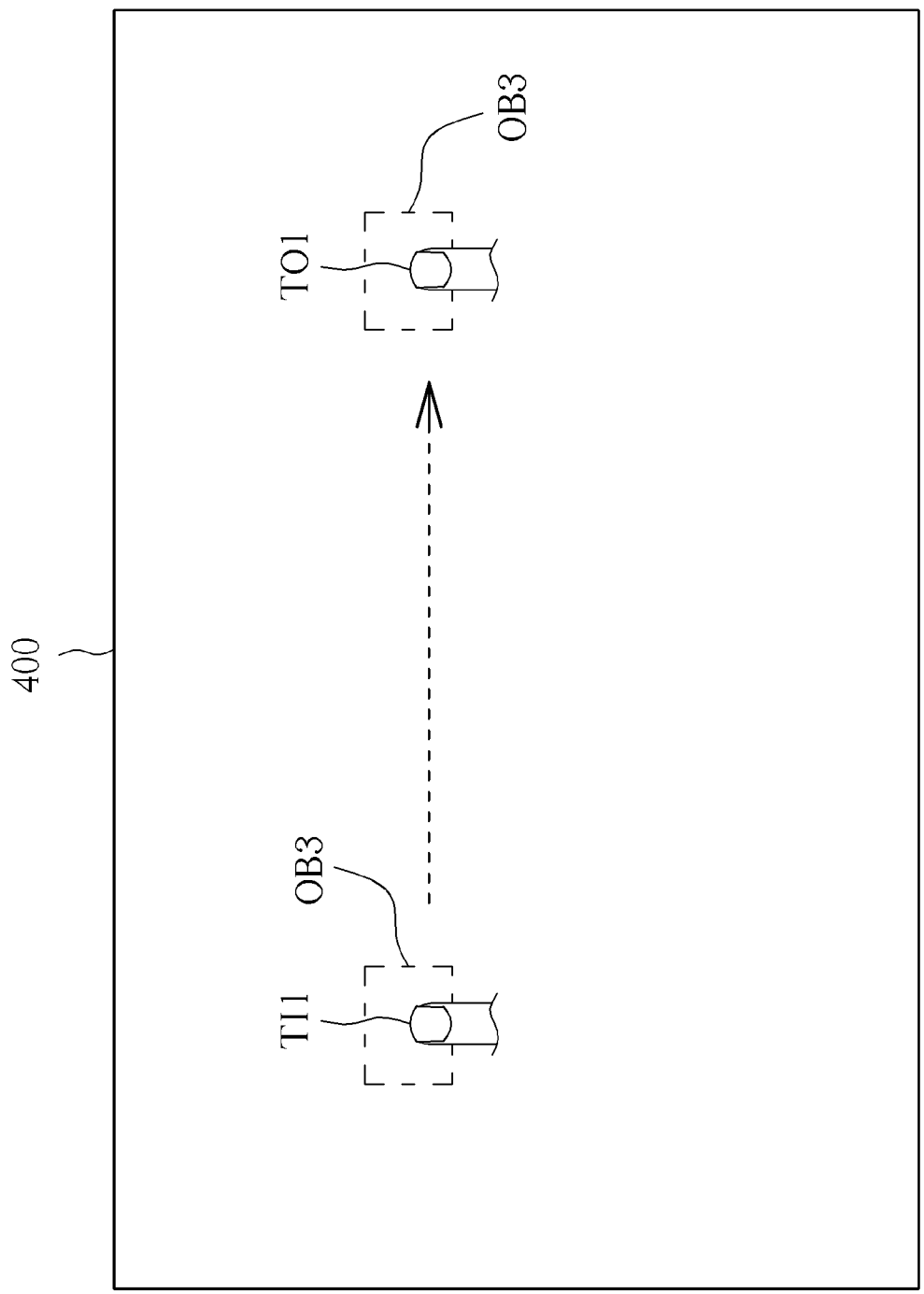
FIG. 5A and FIG. 5B are schematic diagrams of a moving point gesture of a touch sense device in FIG. 4 when a host is operating under different modes according to an embodiment.
Figure 5B:
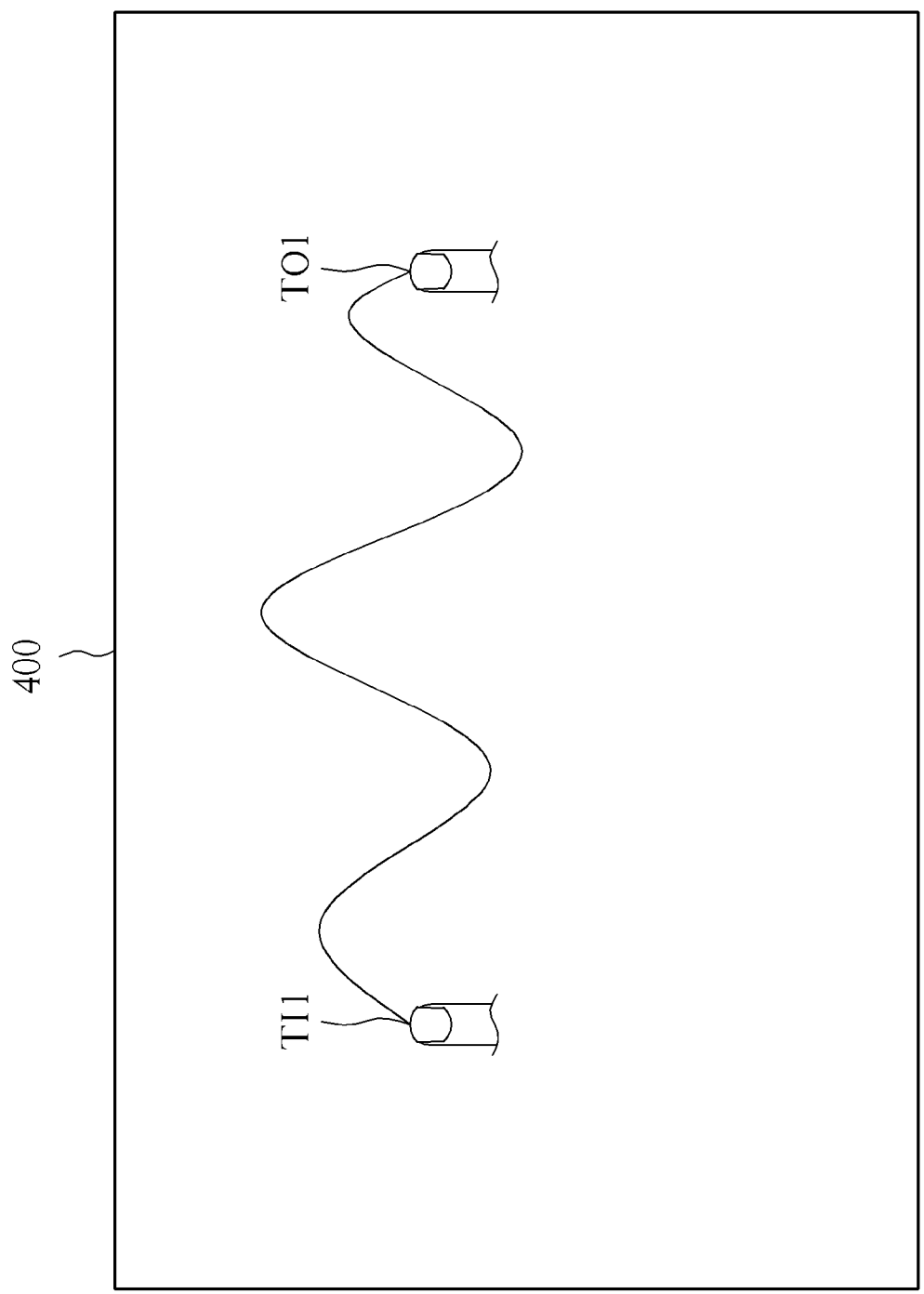

FIG. 5A to FIG. 5B illustrate operations of the host 404 according to the packet Pac. Please refer to FIG. 5A and FIG. 5B, which are schematic diagrams of moving point gestures of the touch sense device 400 in FIG. 4 when the host is operating under different modes according an embodiment. As shown in FIG. 5A, the host 404 starts operating under a desktop mode in an embodiment, and when a user intends to move an object OB3, the user may intuitively and directly start touching at an entering point TI1 displayed on a screen and end touching after moving to a leaving point TO1; the determining unit 408 can then determine a moving path of the moving point gesture starts at the entering point TI1, and determine the moving path of the moving point gesture ends at the leaving point TO1, and also determine all touch points during process of the moving point gesture. Moreover, the determining unit 408 may transmit a corresponding packet Pac to the host 404, such that the host 404 moves the object OB3 from a position corresponding to the entering point TI1 to a position corresponding to the leaving point TO1.

On the other hand, as shown in FIG. 5B, in another embodiment, assuming the host 404 starts operating in a free-drawing mode of a painting application, and when the user intends to perform line-drawing, the user may intuitively start touching at the entering point TI1 and end touching after moving to the leaving point TO1; the determining unit 408 can then determine that the moving path of the moving point gesture starts at the entering point TI1, and determine that the moving path ends at a position of the leaving point TO1, and also determine all moving points during process of the moving point gesture. Furthermore, during process of the moving point gesture, the determining unit 408 may further transmit a corresponding packet Pac to the host 404, for the host 404 to start line-drawing at a position corresponding to the entering point TI, and continue line-drawing at corresponding positions of all touch points during the process of the moving-point gesture until a position corresponding to the leaving point TO1 is reached.

Note that, in the aforementioned embodiment the touch control chip 402 may determine a moving path of the moving point gesture starts at the entering point TI1, and determine the moving path ends at the leaving point TO1, and also determine all touch points during the process of the moving point gesture, then acknowledge the host 404 via the packet Pac, for the host 404 to operate accordingly under different operation modes. However the present invention is not limited to this. For instance, when the user concurrently touches two points on the touch sense device 400, the touch control chip 402 may separately determine moving paths of two moving point gestures starting at two entering points, and ending at two leaving points, respectively; and also determine all points during processes of the two moving point gestures, and transmit packets Pac indicating that two moving point gestures concurrently occur, in addition to the aforementioned information. This allows the host 404 to determine an operation according to changes in positions of the moving point gestures, e.g. zoom-in, zoom-out or rotation, etc.

Note that, the moving point gesture determination methods and related descriptions in the aforementioned embodiments serve illustrative purposes only, and practical implementations are not limited thereto, providing that the touch sense device 400 and the screen of the computer system 40 are mapped according to absolute position, and that the touch control chip 402 is capable of directly determining a moving point gesture occurs at an entering point of a touch event without requiring users to first click for confirmation, allowing users to intuitively perform moving point gestures. Those with ordinary skills in the art may make alterations or modifications accordingly, and not limited to operations and determination methods shown in FIG. 4, FIG. 5A and FIG. 5B.

Figure 6:
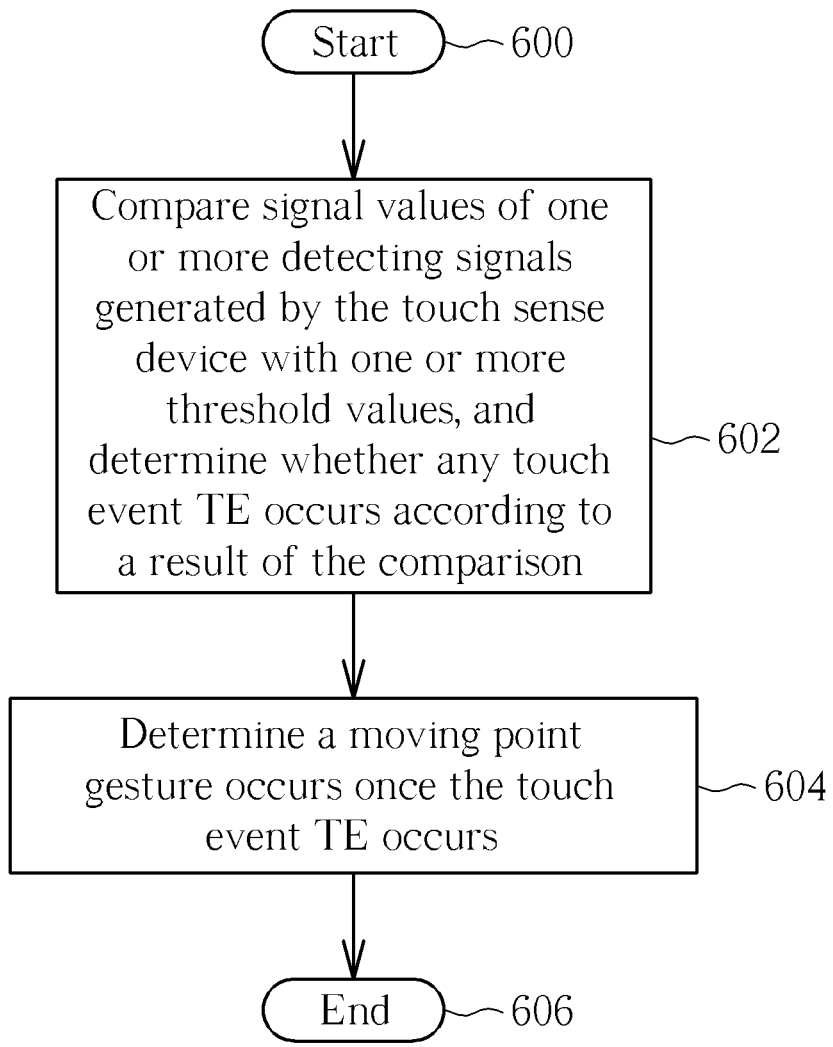
FIG. 6 is a schematic diagram of a moving point gesture determination process according to an embodiment.

The moving point gesture determination method in the aforementioned embodiment may be summarized into a moving point gesture determination process 60. As shown in FIG. 6, the moving point gesture determination process 60 includes following steps:

Step 600: Start.

Step 602: Compare signal values of one or more detecting signals generated by the touch sense device with one or more threshold values, and determine whether a touch event TE occurs according to a result of the comparison.

Step 604: Determine that a moving point gesture occurs once the touch event TE occurs.

Step 606: End.

Details of each step can be derived from operations of corresponding parts of the touch control chip 402, and are not iterated here.

In summary, conventional moving point gesture determination conditions are based on devices having the touch sense device mapped to the screen according to relative position, requiring users to first click for confirmation when they perform moving point gestures. However, such operations are both unintuitive and redundant for devices having the touch sense device mapped to the screen according to absolute position. Comparatively, aforementioned embodiments accommodate absolute position mapping between touch sense devices and screens by modifying definitions and operations of a moving point gesture; i.e. aforementioned embodiments do not require users to first click for confirmation, but rather directly determine the moving point gesture occurs at the entering point of the touch event. Consequently, users may intuitively click on the object to be moved and directly commence moving, without having to first click for confirmation then click again to commence moving. Simply put, the aforementioned embodiments allow users to perform moving point gestures more intuitively and conveniently when the touch sense device and the screen are mapped according to absolute position mapping.

Those skilled in the art will readily observe that numerous modifications and alterations of the device and method may be made while retaining the teachings of the invention.

What is claimed is:

1. A moving point gesture determination method for a touch sense device mapped to a screen according to absolute position, comprising:

comparing one or more signal values of one or more detecting signals generated by the touch sense device with one or more threshold values, to determine whether any touch event occurs; and determining that a moving point gesture occurs as soon as the determination indicates that a touch event occurs;

wherein the step of determining whether the touch event occurs comprises:

(i) continuously comparing the one or more signal values of the one or more detecting signals corresponding to a same position with the one or more threshold values, to detect a continuous occurrence time; and (ii) determining whether the touch event occurs at the same position according to the continuous occurrence time;

wherein the step of determining whether the touch event occurs at the same position according to the continuous occurrence time comprises:

determining whether the continuous occurrence time of the touch event is longer than a first predefined time; and determining the touch event occurs at the same position if the determined result is true;

wherein the step of determining whether the continuous occurrence time of the touch event is longer than the first predefined time comprises:

comparing the one or more signal values of the one or more detecting signals corresponding to the same position with the one or more threshold values, and writing a first bit combination into a sequence if the compared result indicates a make state; and comparing a number of consecutive times the first bit combination is written into the sequence with a first predefined number of times, to determine whether the continuous occurrence time of the touch event is longer than the first predefined time.

2. The moving point gesture determination method of claim 1, wherein the step of determining the moving point gesture occurring comprises determining a moving path of the moving point gesture starts at an entering point when the touch event occurs.

3. The moving point gesture determination method of claim 1 further comprising:
   determining whether the touch event ends according to another result of the comparison after the touch event occurs; and
   determining the moving point gesture ends once the touch event ends.

4. The moving point gesture determination method of claim 3 further comprising determining a moving path of the moving point gesture ends at a leaving point when the touch event ends.

5. The moving point gesture determination method of claim 4, wherein the step of determining whether the touch event ends according to the another result of the comparison further comprises:
   continuously comparing the one or more signal values of the one or more detecting signals corresponding to a same position with the one or more threshold values, to detect a continuous stop time of the touch event; and
   determining whether the touch event ends at the same position according to the continuous stop time of the touch event.

6. The moving point gesture determination method of claim 5, wherein the step of determining whether the touch event ends at the same position according to the continuous stop time of the event comprises:
   determining whether the continuous stop time of the touch event is longer than a second predefined time; and
   determining the touch event ends at the same position if the determined result is true.

7. The moving point gesture determination method of claim 6, wherein the step of determining whether the continuous stop time of the touch event is longer than the second predefined time comprises:
   comparing the one or more signal values of the one or more detecting signals with the one or more threshold values, and writing a second bit combination into a sequence when the compared result indicates a break state; and
   comparing a number of consecutive times the second bit combination is written into the sequence with a second predefined number of times, to determine whether the continuous stop time of the touch event is longer than the second predefined time.

8. A touch control chip for a touch control system, the touch control system further comprising a touch sense device, wherein the touch sense device is mapped to a screen according to absolute position, the touch control chip comprising:
   a detection unit, for comparing signal values of one or more detecting signals generated by the touch sense device with one or more threshold values; and
   a determining unit, for determining if any touch event occurs according to a result of the comparison, and determining that a moving point gesture occurs as soon as the determination indicates that a touch event occurs;
   wherein the detection unit continuously compares signal values of one or more detecting signals corresponding to a same position with one or more threshold values, to detect a continuous occurrence time, and determines whether the touch event occurs at the same position according to the continuous occurrence time;
   wherein the determining unit determines whether the continuous occurrence time of the touch event is longer than a first predefined time duration; and determines the touch event occurs at the same position if the determined result is true;
   wherein the detection unit compares signal values of one or more detecting signals corresponding to the same position with the one or more threshold values, and writes a first bit combination into a sequence if the compared result indicates a make state; and compares a number of consecutive times the first bit combination is written into the sequence with a first predefined number of times, to determine whether the continuous occurrence time of the touch event is longer than the first predefined time.

9. The touch control chip of claim 8, wherein the determining unit determines a moving path of the moving point gesture starts at an entering point when the touch event occurs.

10. The touch control chip of claim 8, wherein the determining unit determines whether the touch event ends according to another result of the comparison after the touch event occurs; and determines the moving point gesture ends once the touch event ends.

11. The touch control chip of claim 10, wherein the determining unit determines a moving path of the moving point gesture ends at a leaving point when the touch event ends.

12. The touch control chip of claim 11, wherein the detection unit continuously compares signal values of the one or more detecting signals corresponding to a same position with the one or more threshold values, to detect a continuous stop time of the touch event; and determines whether the touch event ends at the same position according to the continuous stop time of the touch event.

13. The touch control chip of claim 12, wherein the determining unit determines whether the continuous stop time of the touch event is longer than a second predefined time; and determines the touch event ends at the same position if the determined result is true.

14. The touch control chip of claim 13, wherein the detection unit compares the one or more signal values of the one or more detecting signals with the one or more threshold values, and writes a second bit combination into a sequence when the compared result indicates a break state, and it compares a number of consecutive times the second bit combination is written into the sequence with a second predefined number of times, to determine whether the continuous stop time of the touch event is longer than the second predefined time.

15. A touch control system, comprising:
   a touch sense device, for generating one or more signal values of one or more detecting signals, and mapped to a screen according to absolute position; and
   the touch control chip of claim 8, for determining a moving point gesture according to the one or more signal values of the one or more detecting signals generated by the touch sense device.

16. A computer system, comprising:
   a screen, mapped to a touch sense device of the touch control system according to absolute position;
   the touch control system of claim 15, for cooperating with the screen to determine a moving point gesture; and
   a host, for receiving a packet of the moving point gesture from the touch control system to operate according to the moving point gesture.

17. A moving point gesture determination method for a touch sense device mapped to a screen according to absolute position, comprising:

> comparing one or more signal values of one or more detecting signals generated by the touch sense device with one or more threshold values, to determine whether any touch event occurs;
>
> determining that a moving point gesture occurs as soon as the determination indicates that a touch event occurs;
>
> determining whether the touch event ends according to another result of the comparison after the touch event occurs;
>
> determining the moving point gesture ends once the touch event ends; and
>
> determining a moving path of the moving point gesture ends at a leaving point when the touch event ends;
>
> wherein the step of determining whether the touch event ends according to the another result of the comparison further comprises:
>
> > continuously comparing the one or more signal values of the one or more detecting signals corresponding to a same position with the one or more threshold values, to detect a continuous stop time of the touch event; and
> >
> > determining whether the touch event ends at the same position according to the continuous stop time of the touch event;
>
> wherein the step of determining whether the touch event ends at the same position according to the continuous stop time of the event comprises:
>
> > determining whether the continuous stop time of the touch event is longer than a second predefined time; and
> >
> > determining the touch event ends at the same position if the determined result is true;
>
> wherein the step of determining whether the continuous stop time of the touch event is longer than the second predefined time comprises:
>
> > comparing the one or more signal values of the one or more detecting signals with the one or more threshold values, and writing a second bit combination into a sequence when the compared result indicates a break state; and
> >
> > comparing a number of consecutive times the second bit combination is written into the sequence with a second predefined number of times, to determine whether the continuous stop time of the touch event is longer than the second predefined time.

18. A touch control chip for a touch control system, the touch control system further comprising a touch sense device, wherein the touch sense device is mapped to a screen according to absolute position, the touch control chip comprising:

> a detection unit, for comparing signal values of one or more detecting signals generated by the touch sense device with one or more threshold values; and
>
> a determining unit, for determining if any touch event occurs according to a result of the comparison, and determining that a moving point gesture occurs as soon as the determination indicates that a touch event occurs;
>
> wherein the determining unit determines whether the touch event ends according to another result of the comparison after the touch event occurs; and determines the moving point gesture ends once the touch event ends;
>
> wherein the determining unit determines a moving path of the moving point gesture ends at a leaving point when the touch event ends;
>
> wherein the detection unit continuously compares signal values of the one or more detecting signals corresponding to a same position with the one or more threshold values, to detect a continuous stop time of the touch event; and determines whether the touch event ends at the same position according to the continuous stop time of the touch event;
>
> wherein the determining unit determines whether the continuous stop time of the touch event is longer than a second predefined time; and determines the touch event ends at the same position if the determined result is true;
>
> wherein the detection unit compares the one or more signal values of the one or more detecting signals with the one or more threshold values, and writes a second bit combination into a sequence when the compared result indicates a break state, and it compares a number of consecutive times the second bit combination is written into the sequence with a second predefined number of times, to determine whether the continuous stop time of the touch event is longer than the second predefined time.

* * * * *